Figure 1:
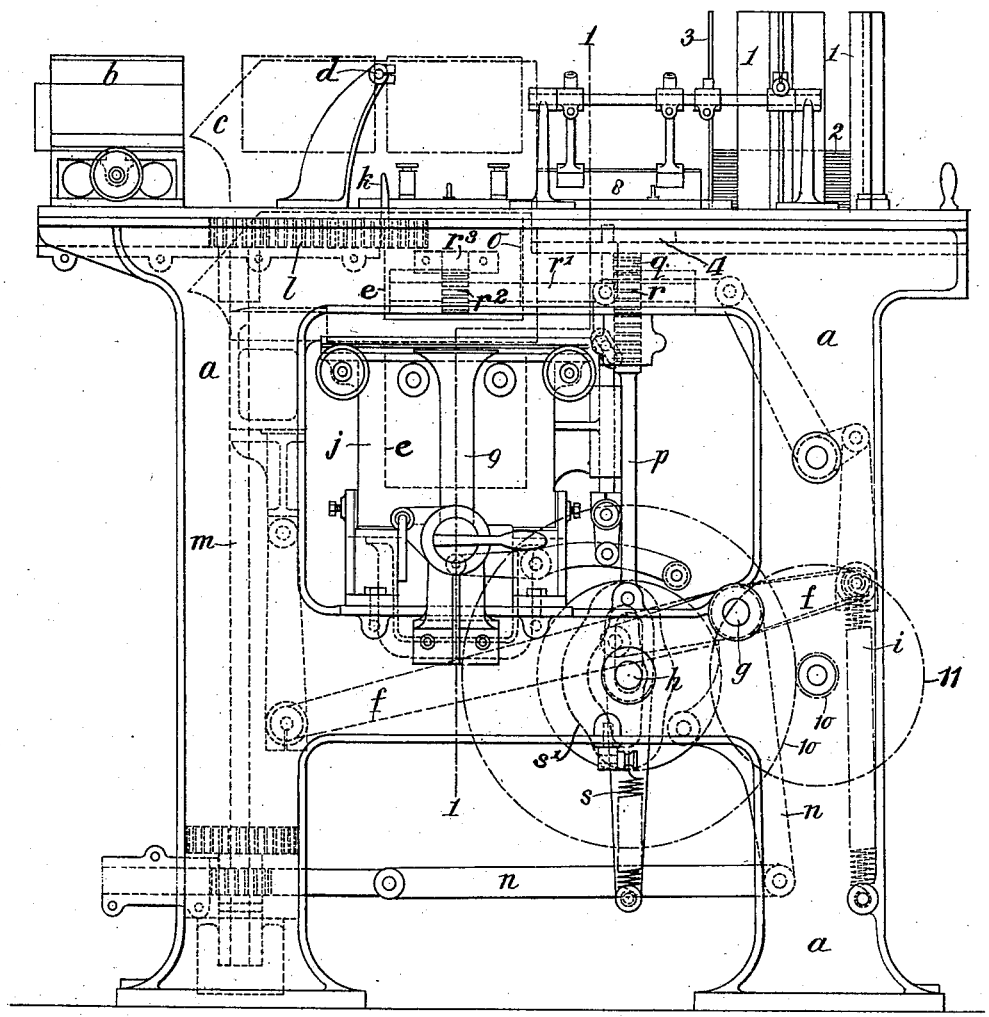

No. 879,485. PATENTED FEB. 18, 1908.
J. MURRAY.
MACHINE FOR CASING-IN BOOKS.
APPLICATION FILED NOV. 2, 1906.

6 SHEETS—SHEET 1.

Witnesses:-
Henry Thieme
F. George Barry

Inventor:-
John Murray
by attorneys

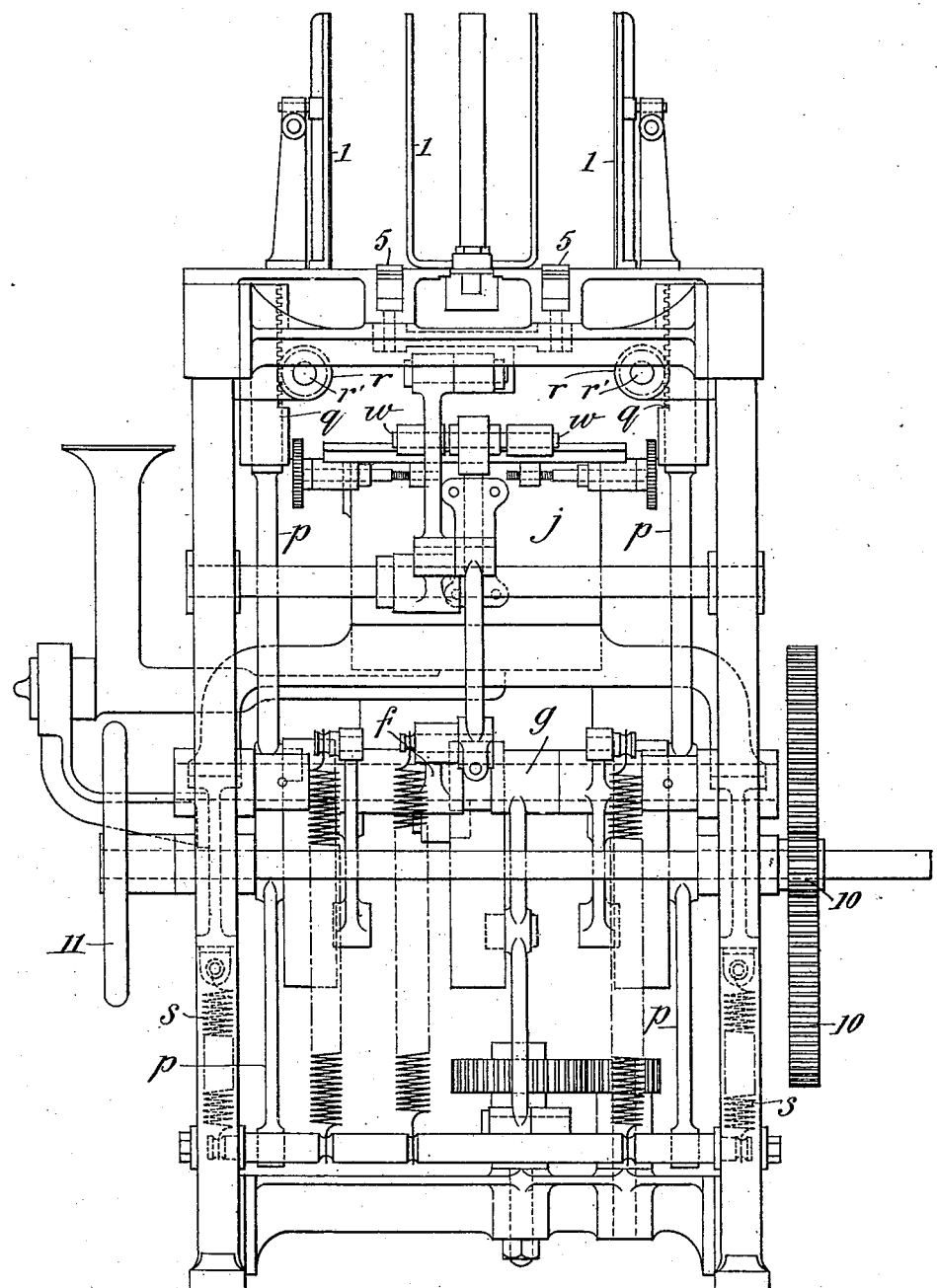

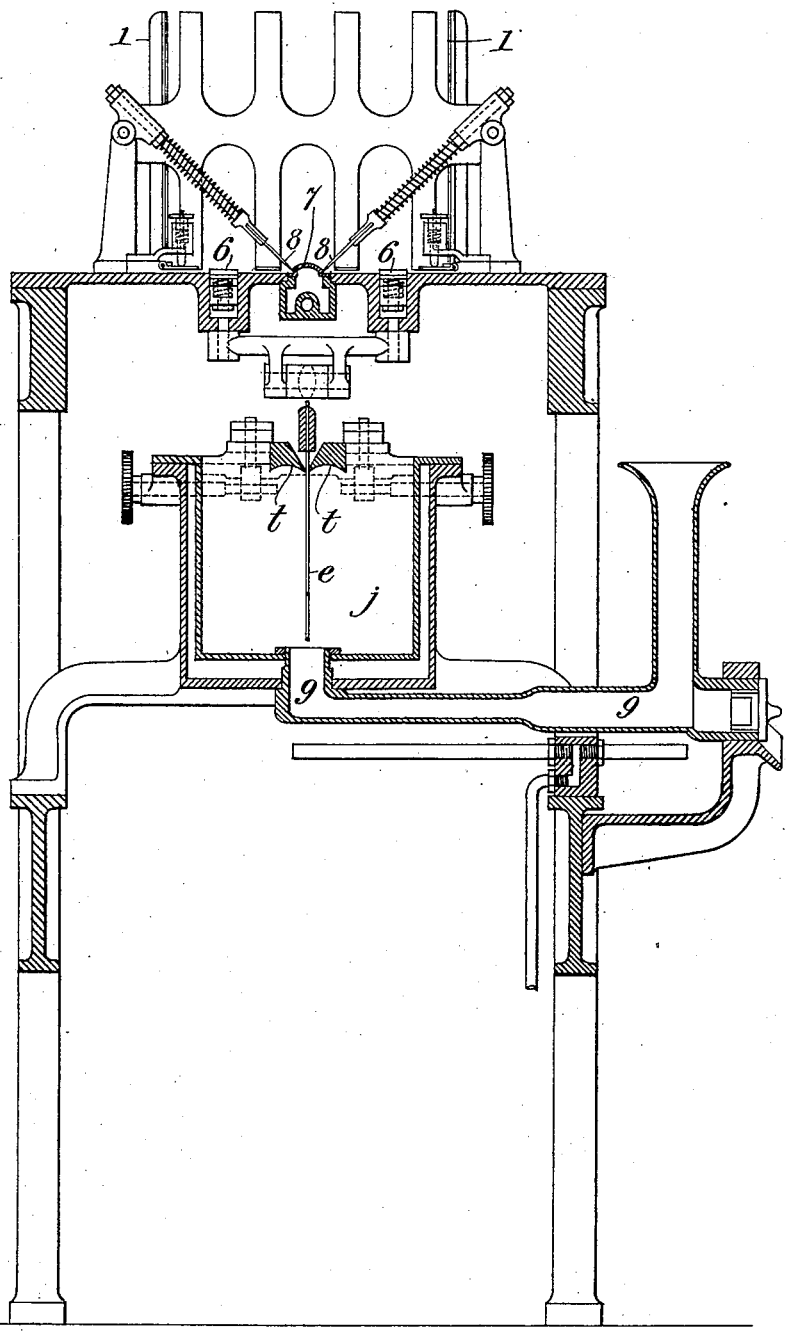

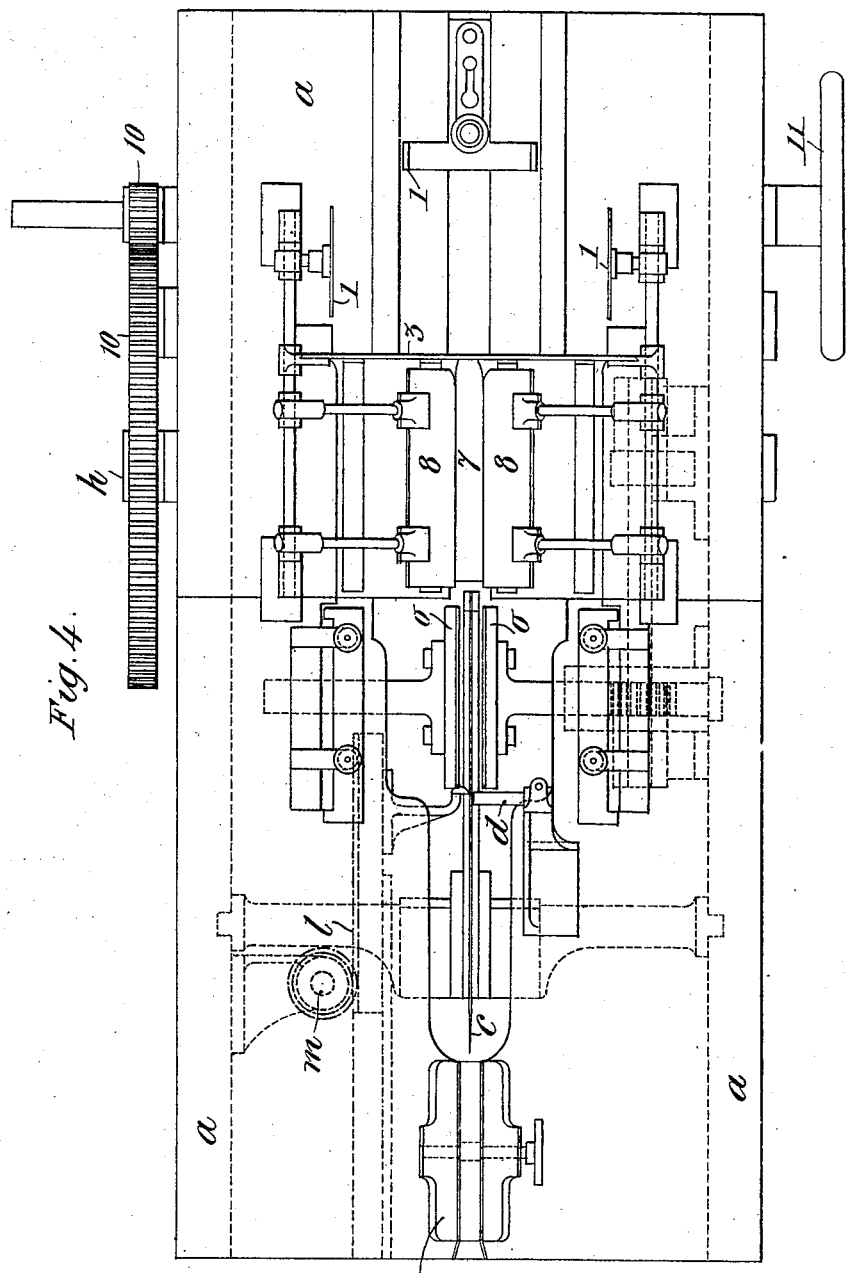

No. 879,485.
PATENTED FEB. 18, 1908.
J. MURRAY.
MACHINE FOR CASING-IN BOOKS.
APPLICATION FILED NOV. 2, 1906.
6 SHEETS—SHEET 5.
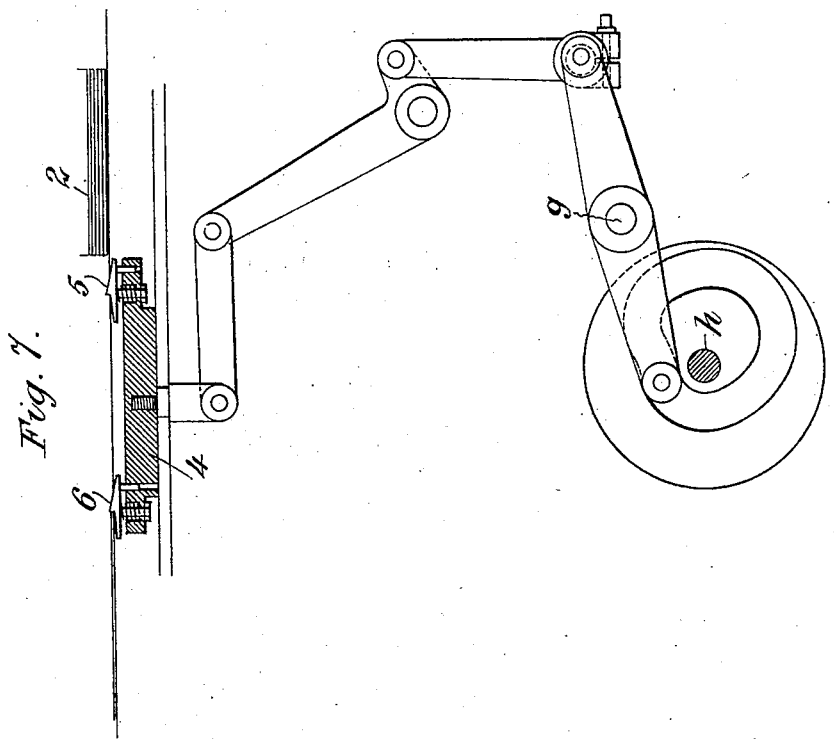
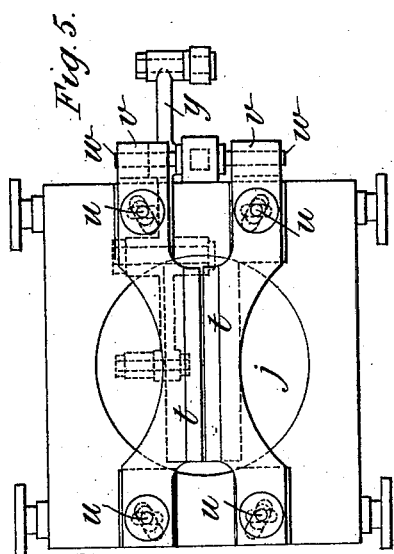
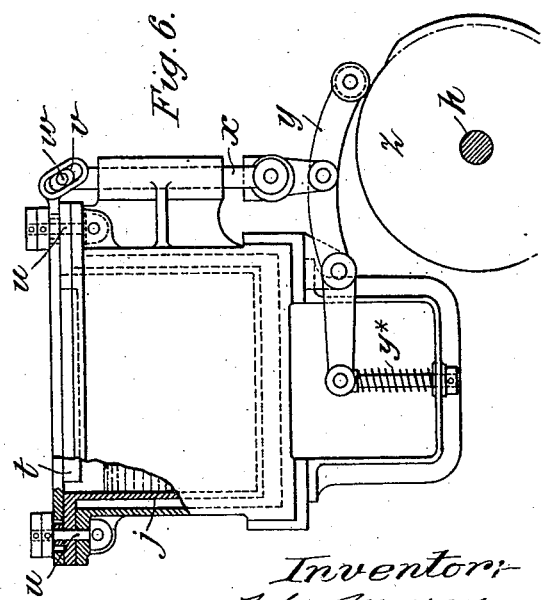

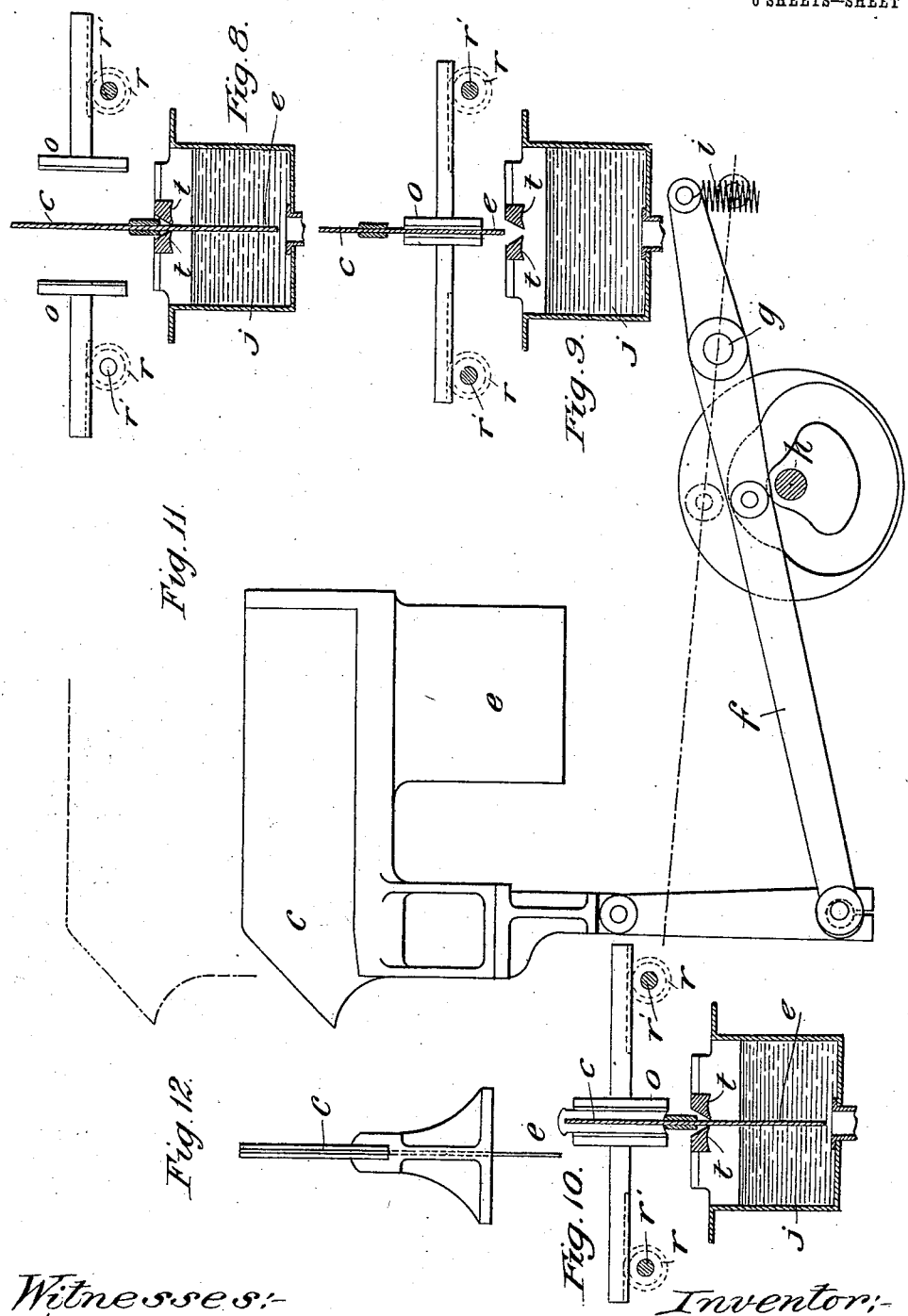

UNITED STATES PATENT OFFICE.

JOHN MURRAY, OF EDINBURGH, SCOTLAND.

MACHINE FOR CASING-IN BOOKS.

No. 879,485.  Specification of Letters Patent.  Patented Feb. 18, 1908.

Application filed November 2, 1906. Serial No. 341,694.

*To all whom it may concern:*

Be it known that I, JOHN MURRAY, engineer, a subject of the King of Great Britain, and resident of Parkside Works, Dalkeith Road, Edinburgh, Scotland, have invented new and useful Improvements in Machines for Casing-in Books, of which the following is a specification.

The present invention is directed to the improvement of machines for pasting or gluing cases to books.

In machines for this purpose previously known, books to be covered are suspended on a knife edge and lowered through a table beneath which a glue pot is placed. While in the lowered position the sides of the book are smeared with glue and a cover is placed on the table face down with the back bridging the space through which the book has descended. In rising again the book takes the cover from the table and the sides of the cover fall into contact with the glued sides of the book to which they adhere.

In the machine which forms the subject of this invention the same operations are performed, the mechanism however now employed is constructed and arranged in the special manner about to be described.

The book to be covered is placed on its fore edge and pushed by hand, preferably with the aid of a guide, onto the knife edge of the movable book support. This book support operates in conjunction with a device for positioning the book between the gluing surfaces which in the present case are a pair of vertical plates carried on horizontal rods movable endwise to move the plates towards and away from the book, like the plates of a press. Glue is conveyed to the surface of these plates by means of a pendent extension of the book support which as the book support moves down dips into a glue pot placed as usual beneath the spot where the book is glued. The gluing plates are timed to move in and out as the book support goes up and down. When the latter is up the said plates advance into contact with the pendent extension which has just emerged from the glue pot and has risen between suitably placed scrapers to a position between and in line with the gluing plates. The gluing plates charged by contact with the extension mentioned recede and when they next advance they come against the sides of the book which is now lowered to receive the glue. Thus alternately the plates receive a charge of glue and transfer it to the book before the latter is raised into the covering position.

The covers which have as usual to be laid face downwards across the space where the book will rise are fed to that position singly but they are previously submitted to a device whereby their backs are properly "formed" before they come into contact with the book. The device for "forming" the covers is placed between the cover hopper and the affixing position and comprises a suitably heated "former" having suitably placed longitudinal grooves therein. In conjunction with this grooved former are arranged inclined plates the edges of which are directed into the grooves.

The cover is fed endwise between the headed former and the inclined plates so that the back is thereby rounded and provided on either side with properly placed indentations.

In the accompanying drawings Figure 1 is a side elevation of the book binding or casing in machine which forms the subject of the present invention, Fig. 2 is an end view as seen from the right of Fig. 1. Fig. 3 is a cross section on the line 1—1 of Fig. 1. Fig. 4 is a plan view with some minor features omitted, Figs. 5 and 6 are detached plan and side views of the adhesive scraper mechanism, Fig. 7 is a side view detached of the feeding mechanism for the covers, Figs. 8, 9 and 10 show detached the adhesive pot and mechanism for transferring adhesive to the sides of the book in three positions, Figs. 11 and 12 are detached side and front views of the book supporting device and operating lever.

The frame *a* of the machine carries a book guide *b* (see Figs. 1 and 4) the sides of which are laterally adjustable to suit different thicknesses of book. A book placed in the guide *b* on its fore-edge is pushed on to the knife edge of the book support *c* up to the stop *d* so that the support is introduced between the leaves. This book support *c* (shown in detail at Figs. 11 and 12) which has a pendent portion *e* has imparted to it an up and down movement by means of a lever *f* fulcrumed at *g* and operated by a cam on the countershaft *h*; *i* is a balance spring attached to the lever *f* to counterweight the book and its support.

*j* is the pot for holding glue or other adhesive material. This pot is placed immediately beneath the pendent portion or plate *e* of the book support *c* so that when the latter is lowered the plate e dips into the glue. During the lowering of the book support c the book is advanced from the left hand dotted position to the right hand dotted position of Fig. 1. This is effected by the finger k carried by the rack l shown dotted in Fig. 1, which rack is moved to and fro by a pinion rotated by a vertical shaft m which receives its rotation by means of a pinion and rack moved to and fro by link rod and lever n operated by a cam on the countershaft h before mentioned. The timing of the rack l is such that the finger k gets behind the book when the latter is lowered clear of the stop d.

The adhesive is transferred from the plate e to the sides of the book by means of plates o (Figs. 1, 8, 9 and 10). These plates are moved in and out by means of vertical rods p p provided with racks q q engaging with pinions r on shafts r' which have other pinions $r^2$ engaging with racks $r^3$ affixed to the shanks of the plates o aforesaid. The rods p p have an upward tendency by reason of springs s s and a downward tendency by reason of a cam s' on the shaft h. The plates o alternately close up against the plate e which rises from the pot j coated with adhesive and against the book sides thereby imparting to the book the glue taken from the plate e. For removing surplus glue from the plate e scrapers t t are provided. These are moved diagonally toward and away from each other by mechanism clearly seen at Figs. 5 and 6. u u u u are guide pins adjustable laterally by means of set screws. The pins engage with diagonal slots in the scrapers t so that as the latter are moved lengthwise they also move laterally. The scrapers t are furnished with bosses v into which project the ends of the pin w. An inclined loop carried on the vertically sliding rod x embraces the pin w so that as the rod x is raised by the lever y and cam z the scrapers t previously adjusted are caused to advance diagonally toward the plate e and thus remove the superfluous glue therefrom as it rises from the pot. The rod x is moved downwardly and the scrapers moved diagonally away from each other by the action of the spring $y^*$.

1 is a hopper containing the book covers 2. The front of the hopper is provided with a movable plate 3 which can be adjusted to suit the size of the covers in use. The covers are fed out beneath the plate 3 by means of the feeder 4 shown in Fig. 7. The feeder consists of a plate carrying spring catches 5 and 6. This plate slides horizontally to and fro under the impulse of a set of levers as shown and engages its catch 5 on the lowest cover in the hopper when about to move towards the left of Fig. 1. The leftward movement draws out the bottom cover from the pile and when the feeder retires the cover is left, just outside the hopper in what may be called its middle position. The retirement of the feeder into the hopper to fetch another cover brings the catch 6 into a position to advance the previously moved cover another step. The catches are provided with springs to allow them to pass under the covers in the backward direction without undue friction.

While the cover is in its middle position it is "formed" ready to receive the book. The "former" is best seen at Figs. 3 and 4.

7 is the "former" having an upper surface shaped like the back of a book and having longitudinal creases into which project plates 8, 8. The former 7 is suitably heated and the book cover is slidden into position thereon and receives its rounded form by the pressure of the plates 8. The formed cover is then advanced by the catch 6 to the position opposite the book to be covered in. This takes place at the time the book is lowered to receive the glue so that when it rises it rises into the cover and lifts the same in a manner that is well understood.

The adhesive pot j is jacketed as seen in Fig. 3 and is provided with a filling pipe 9 kept hot by gas jets if desired.

Any convenient source of power for driving the machine may be used. A train of gearing 10 also a hand wheel 11 are shown in the accompanying drawing. After being covered the books are removed from the knife-edge by hand.

What I claim and desire to secure by Letters Patent of the United States is:—

1. A casing-in machine for books comprising a knife-edge support for the book, a pendent extension on the support, an adhesive pot immediately beneath the book support extension, means for lowering and raising the support thereby dipping the extension into the adhesive, means for advancing an open cover over the back of the book when the support is lowered, a pair of gluing surfaces and means for advancing the latter alternately into contact with the book support extension and the sides of the book to be covered.

2. A casing-in machine for books comprising a knife-edge support for the book, a pendent extension on the support, an adhesive pot immediately beneath the book support extension, means for lowering and raising the support thereby dipping the extension into the adhesive, means for regulating the amount of the adhesive applied to the book, means for advancing an open cover over the back of the book when the support is lowered, a pair of gluing surfaces and means for advancing the latter alternately into contact with the book support extension and the sides of the book to be covered.

3. A casing-in machine for books comprising a knife-edge support for the book, a pendent extension on the support, an adhesive pot immediately beneath the book support extension, means for lowering and raising the support thereby dipping the extension into the adhesive, means for advancing an open cover over the back of the book when the support is lowered, means for forming the back of said cover into a curve, a pair of gluing surfaces and means for advancing the latter alternately into contact with the book support extension and the sides of the book to be covered.

4. A casing-in machine for books comprising a knife-edge support for the book, means for automatically sliding the book along said support, a pendent extension on the support, an adhesive pot immediately beneath the book support extension, means for lowering and raising the support thereby dipping the extension into the adhesive, means for advancing an open cover over the back of the book when the support is lowered, a pair of gluing surfaces and means for advancing the latter alternately into contact with the book extension and the sides of the book to be covered.

5. A casing-in machine for books comprising a knife-edge support for the book, a pendent extension on the support, an adhesive pot immediately beneath the book support extension, means for lowering and raising the support thereby dipping the extension into the adhesive, a hopper for book covers, means for automatically feeding covers from said hopper, means for advancing an open cover over the back of the book when the support is lowered, a pair of gluing surfaces and means for advancing the latter alternately into contact with the book support extension and the sides of the book to be covered.

In testimony whereof I have signed my name to this specification in the presence of two subscribing witnesses.

JOHN MURRAY.

Witnesses:
 NORA WYLIE,
 GEORGE COBB.